(12) United States Patent
Buchhold et al.

(10) Patent No.: US 11,146,072 B2
(45) Date of Patent: Oct. 12, 2021

(54) INVERTER WITH AT LEAST TWO DC/DC CONVERTERS AND USE OF SUCH AN INVERTER IN A PHOTOVOLTAIC INSTALLATION

(71) Applicant: SMA Solar Technology AG, Niestetal (DE)

(72) Inventors: Stefan Buchhold, Lohfelden (DE); Jens Friebe, Vellmar (DE); Michael Kotthaus, Niestetal (DE); Torsten Soederberg, Soehrewald (DE); Thomas Wappler, Guxhagen (DE); Ephraim Moeser, Fuldatal (DE)

(73) Assignee: SMA Solar Technology AG, Niestetal (DE)

( * ) Notice: Subject to any disclaimer, the term of this patent is extended or adjusted under 35 U.S.C. 154(b) by 36 days.

(21) Appl. No.: 16/661,037

(22) Filed: Oct. 23, 2019

(65) Prior Publication Data
US 2020/0136394 A1   Apr. 30, 2020

(30) Foreign Application Priority Data
Oct. 30, 2018  (DE) ...................... 10 2018 127 132.8

(51) Int. Cl.
| | |
|---|---|
| *H02J 3/00* | (2006.01) |
| *H02J 3/38* | (2006.01) |
| *H02M 7/48* | (2007.01) |
| *H02M 3/28* | (2006.01) |

(52) U.S. Cl.
CPC ............... *H02J 3/383* (2013.01); *H02M 3/28* (2013.01); *H02M 7/48* (2013.01)

(58) Field of Classification Search
CPC .... H02M 2001/007; H02M 3/28; H02M 7/48; H02M 2001/0074; H02J 3/32; H02J 7/345; H02J 3/383; H02J 7/35; H02J 2300/26; Y02E 10/56
See application file for complete search history.

(56) References Cited

U.S. PATENT DOCUMENTS

| | | | |
|---|---|---|---|
| 9,627,893 B2* | 4/2017 | Ramond | ........... H01L 31/02021 |
| 9,997,917 B2 | 6/2018 | Kim | |
| 2006/0152085 A1* | 7/2006 | Flett | ...................... H02M 7/487 |
| | | | 307/75 |
| 2011/0144822 A1 | 6/2011 | Choi | |
| 2013/0285459 A1* | 10/2013 | Jaoui | ......................... H02J 1/10 |
| | | | 307/80 |
| 2013/0328403 A1 | 12/2013 | Kaufman | |
| (Continued) | | | |

FOREIGN PATENT DOCUMENTS

DE      102006023563 A1   11/2007

*Primary Examiner* — Jared Fureman
*Assistant Examiner* — Esayas G Yeshaw
(74) *Attorney, Agent, or Firm* — Eschweiler & Potashnik, LLC

(57) ABSTRACT

The disclosure relates to an inverter with at least one inverter bridge and at least two galvanically isolating DC/DC converters, outputs of the DC/DC converters being connected in parallel with one another and being connected to inputs of the inverter bridge. At least two of the DC/DC converters are intercoupled on the input side via a diode, such that the diode is connected with its terminals to one of the inputs of the two direct voltage converters in each case. The disclosure also relates to a use for such an inverter.

9 Claims, 5 Drawing Sheets

(56) References Cited

U.S. PATENT DOCUMENTS

2014/0122025 A1     4/2014   Mueller
2014/0292085 A1*   10/2014   Yoscovich ................ H02J 3/00
                                                                          307/63

\* cited by examiner

INVERTER WITH AT LEAST TWO DC/DC CONVERTERS AND USE OF SUCH AN INVERTER IN A PHOTOVOLTAIC INSTALLATION

CROSS REFERENCE TO RELATED APPLICATIONS

This application claims priority to German Patent Application number 2018 127 132.8, filed on Oct. 30, 2018, and is hereby incorporated by reference in its entirety.

FIELD

The disclosure relates to an inverter with at least one inverter bridge and at least two DC/DC converters, the inputs of which form DC terminals of the inverter, the outputs of the DC/DC converters being connected in parallel and connected to the inputs of the inverter bridge. The disclosure also relates to the use of such an inverter in a photovoltaic (PV) system.

BACKGROUND

Inverters are used in energy supply systems, such as photovoltaic systems, to convert direct current into alternating current. The inverters are often connected to an energy supply network and generate a single-phase or multi-phase alternating current which is suitable for feeding into the energy supply network in terms of frequency and voltage. An inverter of this type has at least one output bridge circuit, which is also referred to as an inverter bridge.

In photovoltaic systems, it can be provided that the input of the inverter bridge is directly supplied with the voltage provided by the connected power sources, such as PV generators. To be able to set up a power generation system even if the voltage of the power source is lower than a peak voltage of the AC voltage generated, inverters can be used in which one or more DC/DC converters are connected upstream of the inverter bridge. Such a DC/DC converter converts the DC voltage supplied to its input into a higher DC voltage in this application, which is then provided to the inverter bridge.

The PV generator may be construed from several sub-generators and each sub-generator may be assigned to a separate DC/DC converter. In this way, an operating point of the connected sub-generator can be set independently of the operating point of another sub-generator via the voltage conversion ratio of the assigned DC/DC converter. This enables the partial generators to be operated at their best possible operating point even in different insolation situations.

Consistent implementation of this basic principle leads to the so-called module inverter, which comprises a plurality of DC/DC converters, each of which is connected to only one PV module. Each module can thus be operated advantageously at its maximum operating point. A further advantage of module inverters is that they can be used in hazardous situations, since lines connecting the modules and the module inverter are only subjected to the relatively low voltage of a single module.

In contrast to the module inverter, in a string inverter a plurality of modules is connected in series to form a so-called string. In this case, the inverter is supplied with the total voltage of the string modules. The advantage here is a significantly lower effort in terms of material, for example for connecting the individual modules to the inverter.

In addition to the two extreme cases described above in the connection of modules and inverters, further applications are conceivable in which modules are connected separately to the inverter bridge via DC converters, whereas other modules are connected in series in the form of a string to the inverter bridge via a further DC converter. Such a generator constellation is useful, for example, if some of the modules are exposed to the same insolation conditions (these modules can then be connected together as a string), whereas other modules frequently experience shading due to buildings or the like (these modules are then advantageously coupled separately to the AC bridge via DC converters).

The variety of possible and reasonable configurations in the coupling of modules to an inverter bridge is complex for inverter manufacturers, since they have to provide a corresponding variety of their inverter models at least for frequently used constellations, which differ in connection options and assignments of different connections to the DC/DC converters included.

SUMMARY

It is an aspect of the present disclosure to create an inverter that can be used flexibly with different generator constellations in an energy supply system.

An inverter according to this disclosure of the type mentioned above comprises at least two of the DC/DC converters coupled on the input side via a diode, wherein the diode is connected with its terminals to one of the inputs of each of the two DC/DC converters. The term diode also includes an actively controllable diode, i.e. a parallel connection of a rectifying component and a switch. The switch is used to reduce the voltage drop across the device when a current is flowing in the direction of flow, so that the forward losses across the diode are reduced without losing the blocking characteristics. The controllable diode can, for example, be formed by a semiconductor switch with body diode.

The DC-DC converters are provided as galvanically isolating converters. This converter type allows the potential of the converter input terminals to be adjusted independently from the potential present at the converter output terminals. Accordingly, the potential at input terminals of two different converters connected in parallel on the output side may still be independently adjusted relative to each other. For example, a diode arranged between terminals of the two converters may cause a series connection between the two converters when in conductive state. As long as the diode is in non-conductive state, the potential present at the terminals of the one converter may float freely relative to the potential of the other converter.

The diode, which connects two DC/DC converters on the input side, becomes conductive depending on the applied potentials. If individual PV modules are connected to the DC/DC converters independently of each other, there is no potential difference between the DC/DC converters, as a result of which the diodes do not conduct and the DC/DC converters are virtually independent of each other. The inverter is thus operated as a module inverter with regard to these two DC converters. If, on the other hand, a series connection of PV modules, i.e. a PV string, is connected with its poles to inputs which are assigned to two different DC/DC converters which are coupled via the diode, different potentials occur at the two DC/DC converters, making the diode conductive. The inverter thus becomes a string inverter with regard to these two DC/DC converters, without an external bridge or similar having to be set for the input-side series connection of the two DC/DC converters.

The diode(s) automatically adapt the connection of at least two DC/DC converters to the external constellation of the connected PV generator(s). In the manner described above, two or more DC/DC converters, in one embodiment, all DC/DC converters of the inverter, can be concatenated. This requires a number of diodes that is by one smaller than the number of intercoupled DC/DC converters.

According to this disclosure, such an inverter can be used as a string inverter in a photovoltaic system, wherein a PV (partial) generator is connected to two inputs associated with two different DC/DC converters, the two different DC/DC converters forming end elements of a series of DC/DC converters coupled to each other via diodes.

According to this disclosure, such an inverter can also be used as a module inverter in a photovoltaic system, wherein one PV module is connected to each of the two inputs of the at least two DC/DC converters.

In both cases described, at least one of the DC/DC converters can have a storage module or a buffer module connected to the inputs. If the inverter is used as a string inverter, such a storage module or buffer module can also be connected to one of the DC/DC converters in the series connection.

BRIEF DESCRIPTION OF THE DRAWINGS

The disclosure will be explained in more detail below with the help of examples and figures. In the figures
a.

DETAILED DESCRIPTION

Figure 1:
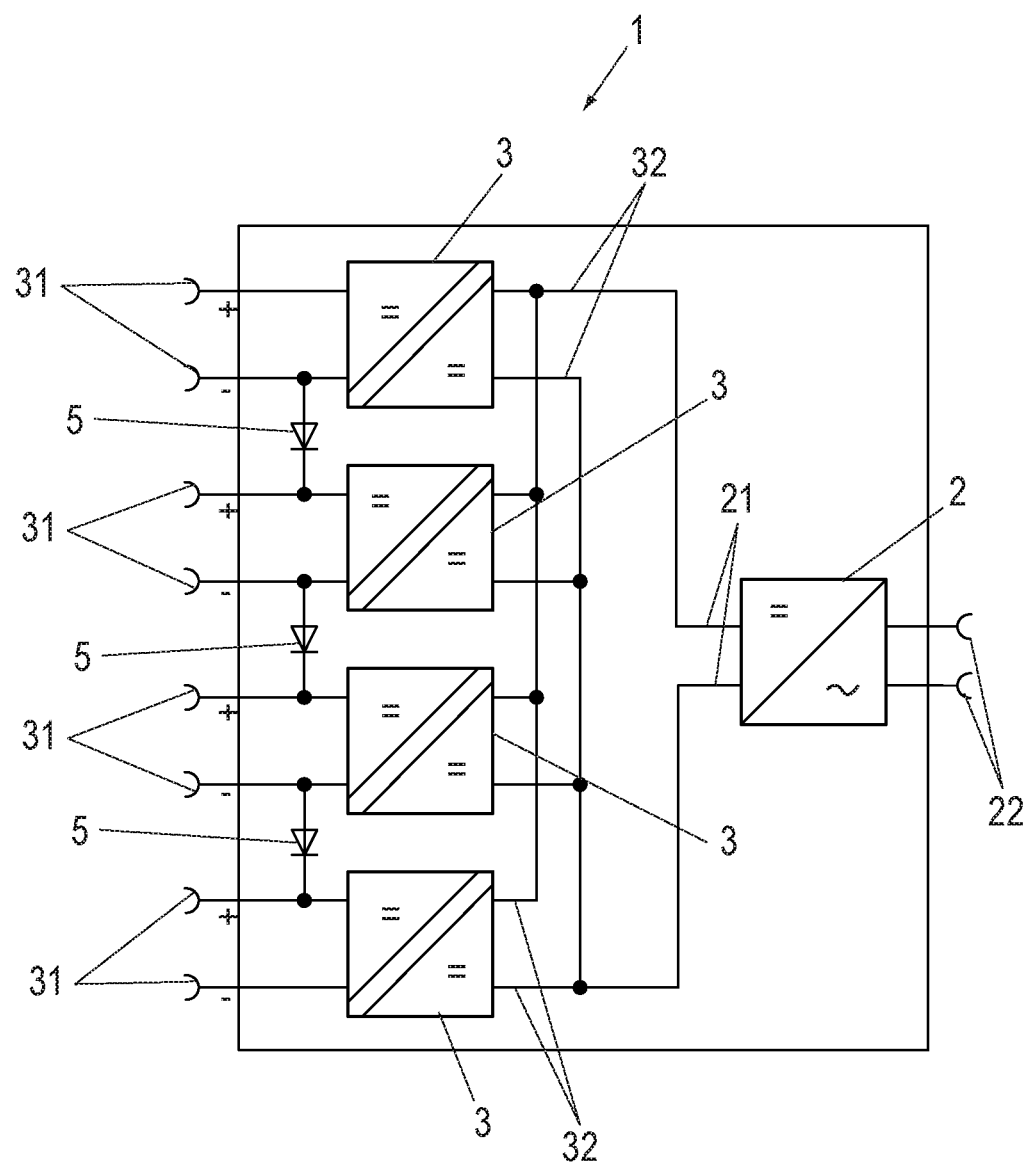
FIG. 1 shows a schematic representation of an inverter with an inverter bridge and DC/DC converters;
b.

FIG. 1 shows in a first example an inverter 1 for a power generation plant, in particular a PV plant, in a schematic block diagram.

Inverter 1 includes an inverter bridge 2 that converts DC voltage supplied to inputs 21 to AC voltage provided at outputs 22. A single-phase inverter bridge 2 is shown here, wherein inverter 1 is suitable for connection to a single-phase power supply grid or to a phase of a multi-phase power supply grid. In alternative designs, the inverter bridge 2 can be multi-phase, in particular three-phase.

Inverter 1 further comprises several DC/DC converters 3, here four of them. The DC/DC converters 3 each have a two-terminal input 31 as well as a two-terminal output 32. On the output side, the DC/DC converters 3 are connected in parallel and connected to the inputs 21 of the inverter bridge 2. In parallel to the inputs 21 of the inverter bridge, 2 DC link capacitors can be provided, serving to buffer the DC voltage at the inputs 21 of the inverter bridge 2. The DC-DC converters 3 are shown as galvanically isolating converters.

The inverter 1 comprises a housing 4 in which the inverter bridge 2 and the DC/DC converters 3 are arranged. As further components of inverter 1, which may also be arranged in housing 4, output side filters, for example, so-called sinus filters, or separating or protective devices may be provided, not shown in the schematic drawing of FIG. 1 for reasons of clarity. The inputs 31 of the DC/DC converters 3 can each be contacted externally on inverter 1 to connect current sources and/or current sinks. They thus represent the DC terminals of inverter 1. As a rule, appropriate plug or screw connectors are provided on the housing 4 of inverter 1 for this purpose, which are connected to inputs 31. Each DC/DC converter 3 is thus assigned two DC terminals, one for negative and one for positive potential. The polarity is given in FIG. 1 at all inputs 31 and in FIGS. 2-5 at all externally connected inputs 31.

In accordance with this disclosure, the DC converters 3 of inverter 1 are intercoupled via diodes 5 on the input side. For this purpose, a diode 5 is connected between a negative input 31 of a DC/DC converter 3 and the positive input 31 of another DC/DC converter 3. The result is a chain of DC/DC converters 3 interconnected via the diodes 5, the outer DC/DC converters 3 of this chain each having a free input 31 not to another of the DC/DC converters 3 via one of the diodes 5. In FIG. 1 these are the DC/DC converters 3 shown in the figure at top and bottom. Three diodes 5 are used to link the four DC/DC converters 3 shown in the figure.

As shown in the following configuration examples, the coupling of the DC/DC converters 3 on the input side via the diodes 5 enables flexible DC-side wiring of inverter 1 without the need for external connection bridges or the like.

Figure 2:
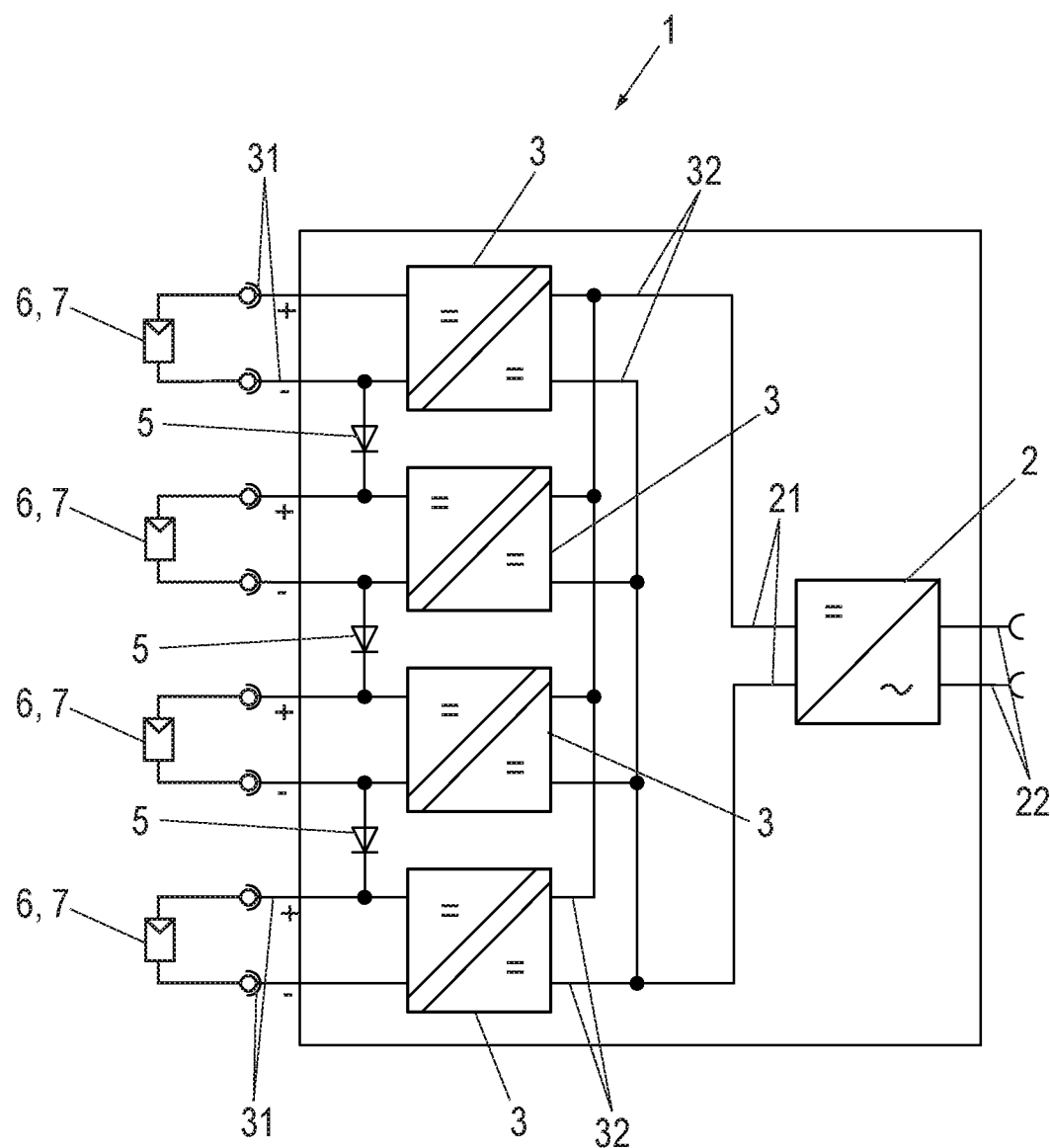
FIGS. 2-5 each show a schematic representation of the inverter shown in FIG. 1 in different configurations of a power generation system.

FIG. 2 first shows an application of inverter 1 in which each DC/DC converter 3 is connected separately to a PV module 6. Each PV module 6 thus represents a PV partial generator 7. The inverter 1 in the arrangement of FIG. 2 is thus connected as a so-called module inverter. FIGS. 2-5 show an example of PV modules 6 represented by the symbol of a single PV cell. It is understood that such a PV module 6 can comprise a plurality of PV cells connected in series and/or in parallel in one or more constructive units.

Since the individual PV modules 6 are not connected to each other, there are no potential differences between the individual PV modules 6 due to the external wiring. Without potential differences between the inputs 31 of two different DC/DC converters 3, there is no potential difference at the terminals of each of the diodes 5 that would lead to a current flow. In the application case of FIG. 2, the diodes 5 are thus virtually without influence, which is why the four DC/DC converters 3 operate independently of each other.

Figure 3:
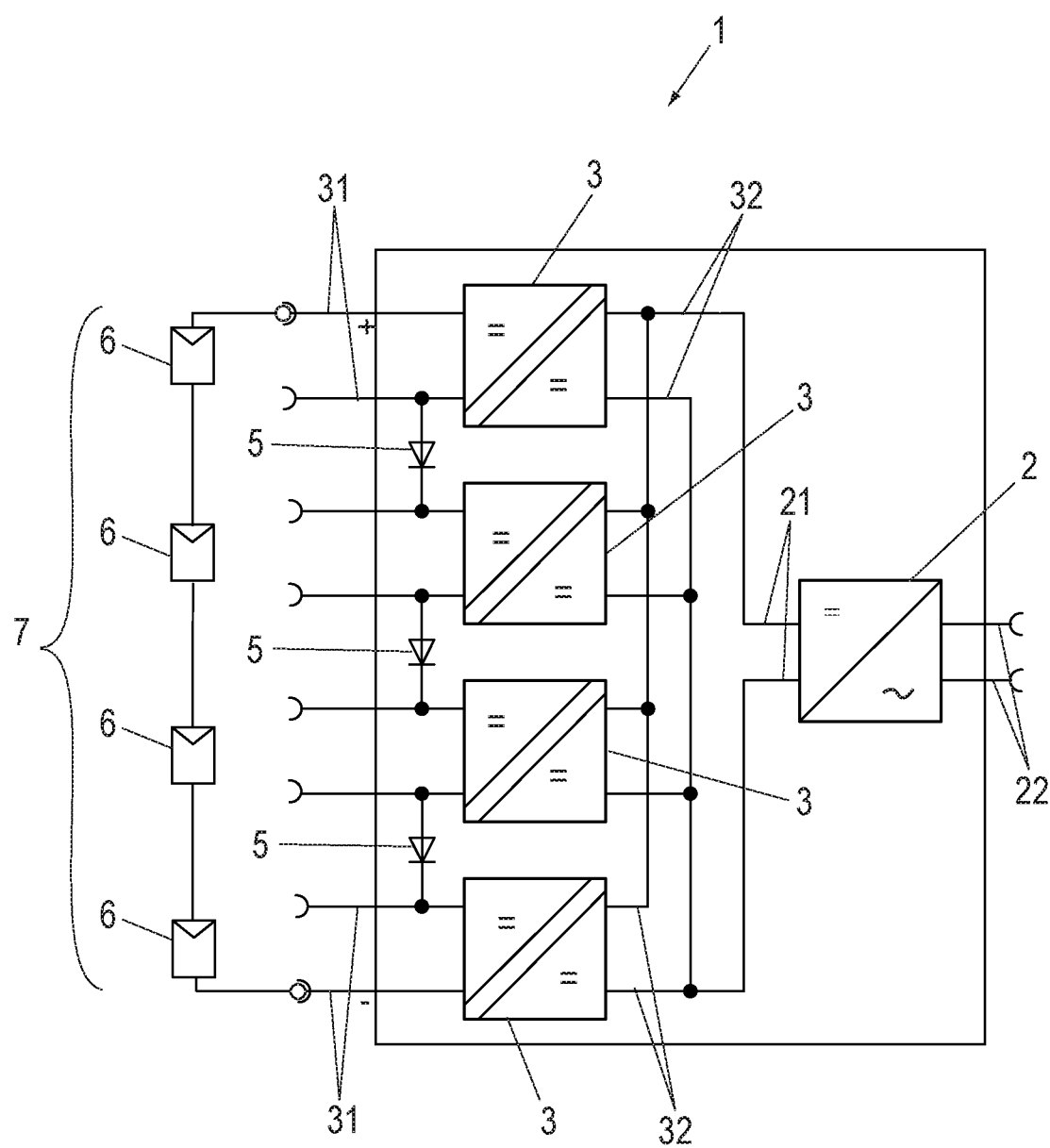

FIG. 3 shows in a way different than FIG. 2 an application in which the inverter 1 is used as string inverter. For this purpose, four PV modules 6 are used as examples to form a PV generator 7 by series connection of PV modules 6. The PV generator 7 is coupled with its two connections to the outer two inputs 31 of inverter 1, i.e. to the inputs 31 of the DC/DC converters 3, which are not connected to another DC/DC converter 3 via one of the diodes 5.

In this disclosure, the voltage provided by the PV generator 7 at the two external inputs 31 leads to a potential difference between the DC/DC converters 3, resulting in a current flow through the diodes 5. In this case, the diodes 5 behave de facto like direct connections. The DC/DC converters 3 are thus connected in series via the diodes 5 on the input side. The voltage provided by the PV generator 7 is distributed among the DC/DC converters 3. If the voltage conversion ratio of the DC/DC converters 3 is set to the same value, the voltage of the PV generator 7 is also evenly distributed among the DC/DC converters 3, so that the DC/DC converters 3 are equally loaded with regard to the converted power.

A prerequisite for the type of linkage of the DC/DC converters 3 via the diodes 5 shown above is that the inputs 31 of the DC/DC converters 3 are potential-free, i.e. that neither of the two inputs 31 of a DC/DC converter 3 is at a fixed defined potential. Otherwise, series connection of the DC/DC converters 3 on the input side is not possible.

Figure 4:
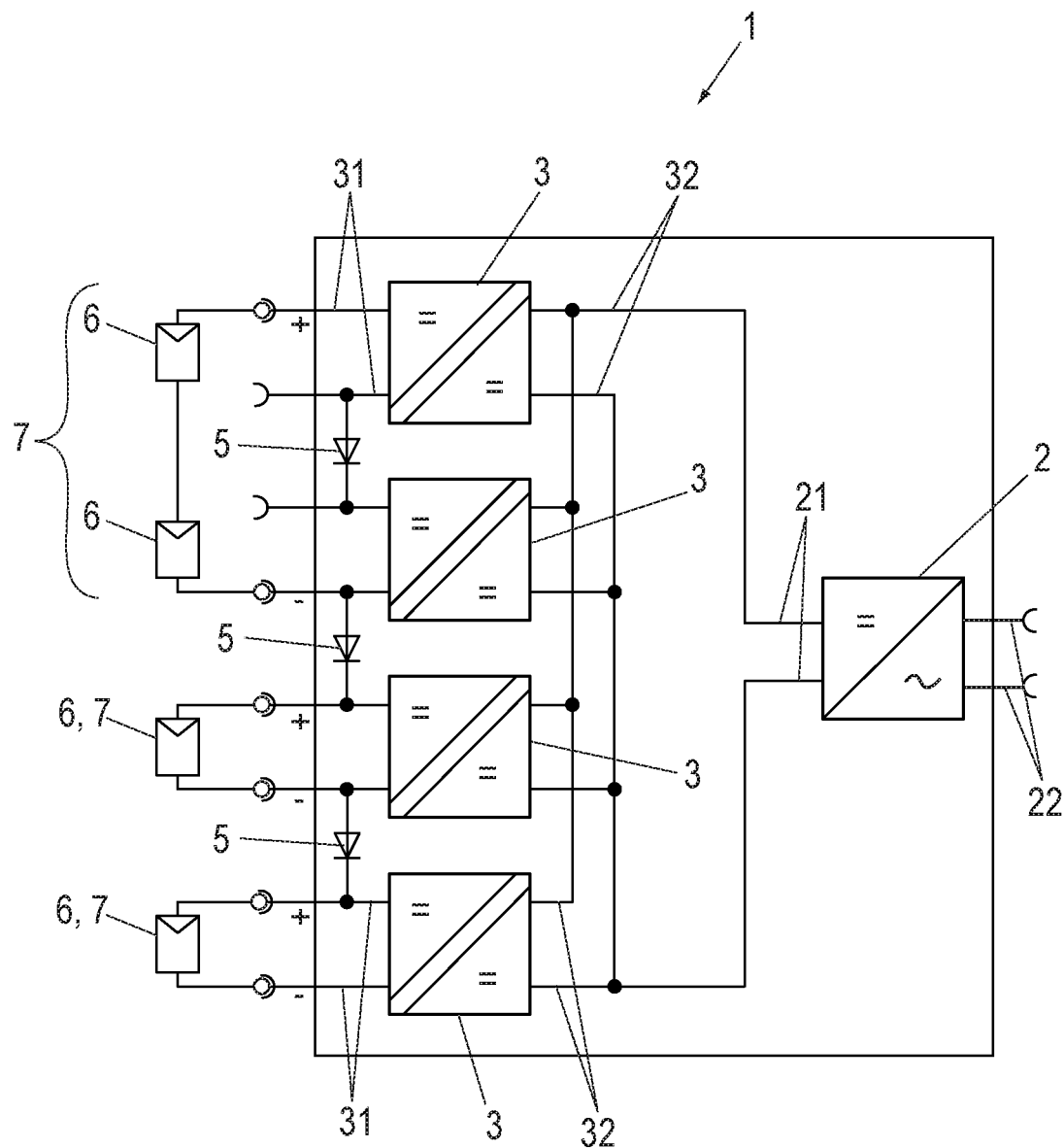

In the application case of inverter 1 shown in FIG. 4, two PV modules 6 are each directly connected to a DC converter 3, whereas two further PV modules 6 in series connection form a string as PV partial generator 7. This PV partial generator 7 with its two connections is each connected to one input 31 of the two upper DC voltage converters 3 in FIG. 4, the second input 31 remaining unconnected externally and therefore being only connected internally via the diode 5.

The example of FIG. 4 shows a mixture of the applications of FIGS. 2 and 3: A series connection of PV sub-generators 7, where more than one PV module is present, can be connected as well as PV sub-generators 7, which each have only one single PV module 6.

In the example shown in FIG. 4, the upper one of the diodes 5, which connects the two DC/DC converters 3 coupled to the PV string, is current-conducting, whereas the lower two diodes 5 are non-conducting, so that the three PV sub-generators 7 present in this application are independent of each other and can therefore also be set independently of each other with regard to their operating point.

Figure 5:
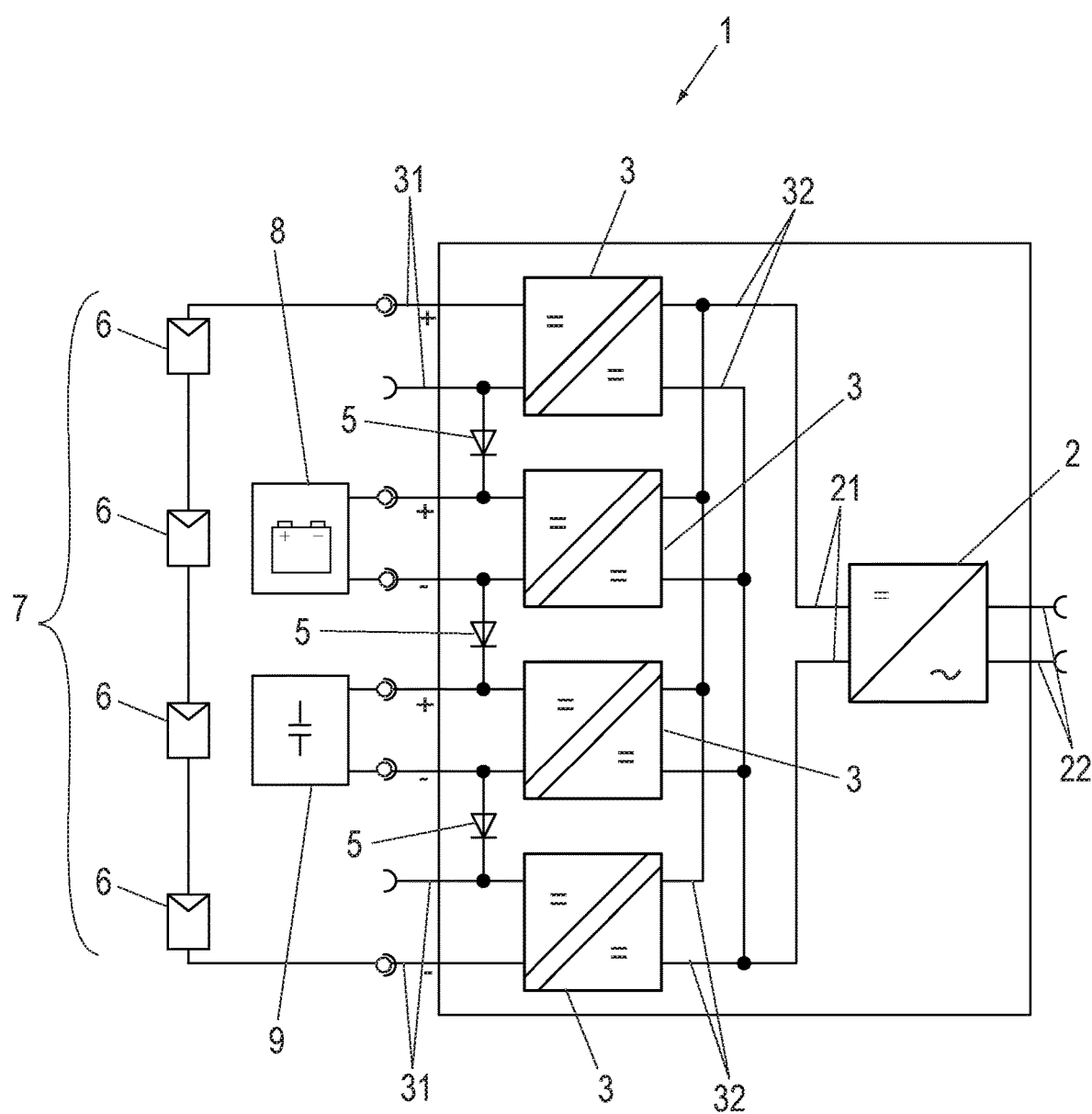

A further application case of the inverter 1 is shown in FIG. 5. In this example, a PV generator 7 consisting as a string of a series connection of several PV modules 6, here again four, is coupled to the inverter 1 in the same way as shown in FIG. 3. In addition, the middle ones of the DC/DC converters 3 in FIG. 5 are each separately connected to a storage module 8 or a buffer module 9.

By means of the corresponding operating mode of the DC/DC converter 3, by means of which a voltage applied between the respective inputs 31 can be set, it is possible to charge or discharge the storage or buffer modules 8, 9 during operation of the PV generator 7. The DC/DC converters 3 are designed as bidirectional converters with which a power flow in both directions is possible. If the PV generator 7 delivers no or insufficient power, energy can be taken from storage module 8 or buffer module 9 and converted into alternating current by the corresponding DC/DC converter 3 and the downstream inverter bridge 2.

The invention claimed is:

1. An inverter, comprising:
   at least one inverter bridge; and
   at least two galvanically isolating DC/DC converters whose inputs form DC terminals of the inverter,
   wherein outputs of the DC/DC converters are connected to one another in parallel and are connected to inputs of the inverter bridge, and
   wherein at least two of the DC/DC converters are intercoupled on the input side thereof via a diode, wherein the diode is connected with its terminals between one of the inputs of the at least two of the DC/DC converters.

2. The inverter according to claim 1, wherein all DC/DC converters are intercoupled via a number of diodes.

3. The inverter according to claim 2, wherein the number of diodes is one smaller than the number of DC/DC converters.

4. The inverter according to claim 1, wherein at least one of the diodes comprises an actively controllable diode.

5. A method of use of an inverter, comprising at least one inverter bridge; and at least two galvanically isolating DC/DC converters whose inputs form DC terminals of the inverter, wherein outputs of the DC/DC converters are connected to one another in parallel and are connected to inputs of the inverter bridge, wherein at least two of the DC/DC converters are intercoupled on the input side thereof via a diode, wherein the diode is connected with its terminals between one of the inputs of the at least two of the DC/DC converters, comprising:
   providing a PV generator comprising a series connected string of PV modules, and
   connecting the PV generator to two inputs of the inverter which are assigned to two different DC voltage converters, the two different DC/DC converters forming end elements of a series circuit of DC/DC converters intercoupled to one another via diodes.

6. The method of use of the inverter according to claim 5, further comprising connecting at least one of the DC/DC converters to the inputs of a storage module or a buffer module.

7. The method of use of the inverter according to claim 5, further comprising connecting a storage module or a buffer module is further connected to one of the DC/DC converters of the series connection.

8. A method of use of an inverter, comprising at least one inverter bridge; and at least two galvanically isolating DC/DC converters whose inputs form DC terminals of the inverter, wherein outputs of the DC/DC converters are connected to one another in parallel and are connected to inputs of the inverter bridge, wherein at least two of the DC/DC converters are intercoupled on the input side thereof via a diode, wherein the diode is connected with its terminals between one of the inputs of the at least two of the DC/DC converters, comprising:
   providing a plurality of PV modules as a module inverter configuration, and
   connecting each PV module to the two respective inputs of the at least two DC/DC converters.

9. The method of use of an inverter according to claim 8, further comprising connecting at least one of the DC/DC converters to the inputs of a storage module or a buffer module.

* * * * *